(12) United States Patent
Rozenblatt

(10) Patent No.: US 6,223,361 B1
(45) Date of Patent: *May 1, 2001

(54) GALLEY WASTE DISPOSAL SYSTEM

(75) Inventor: Mike M. Rozenblatt, Manhatten Beach, CA (US)

(73) Assignee: Mag Aerospace Industries, Inc., Compton, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,965

(22) Filed: May 13, 1998

(51) Int. Cl.$^7$ ........................................ E03C 1/12
(52) U.S. Cl. ............................ 4/653; 4/321; 4/431; 4/668
(58) Field of Search ............................... 4/431, 321, 434, 4/653, 668

(56) References Cited

U.S. PATENT DOCUMENTS

| | | | |
|---|---|---|---|
| 4,357,719 | 11/1982 | Badger et al. | 4/316 |
| 4,376,314 | 3/1983 | Iwans | 4/431 |
| 5,165,457 | 11/1992 | Olin et al. | 4/300 |
| 5,214,807 | * 6/1993 | Terve | 4/431 X |
| 5,245,711 | 9/1993 | Oldfelt et al. | 4/435 |
| 5,813,061 | * 9/1998 | Tornqist | 4/431 |

* cited by examiner

*Primary Examiner*—Robert M. Fetsuga
(74) *Attorney, Agent, or Firm*—Christie, Parker & Hale, LLP

(57) ABSTRACT

A waste disposal system quietly and effectively evacuates solid, liquid, and slurry food waste from a galley sink via a vacuum action created when a normally closed flush valve momentarily opens and eliminates the differential pressure between the sink and the drain line. The system is automatically disabled when a clogged condition is sensed. The sink bowl is equipped with a sealable cover that cuts down the noise associated with vacuum pressure evacuation systems to an acceptable level. The system also has a rinse subsystem including a rinse valve for introducing rinse water into the sink just before a flush operation commences. The sink bowl includes an air inlet port in communication with an air inlet duct that extends outside of and above the cart for providing cabin pressure air to the sink. A controller controls the timing and operation of the flush and rinse operations. The flush control assembly is activated by depressing a flush switch above the assembly which itself is operational only when a vacuum condition is present in the drain line and when a proximity sensor indicates that the sink cover is closed and sealed. An elbow-shaped pipe that prevents rigid, elongate objects from becoming lodged in the drain line connects the sink's disposal outlet to the flush valve assembly.

2 Claims, 3 Drawing Sheets

GALLEY WASTE DISPOSAL SYSTEM

BACKGROUND OF THE INVENTION

1. Field of the Invention

This invention relates to waste disposal systems and, in particular, to a commercial aircraft galley waste disposal system.

2. Description of the Prior Art

In commercial aviation, it is necessary to dispose of unwanted fluids and solids such as human waste and food waste. Disposal of human waste is accomplished with the use of toilet systems such as conventional vacuum toilet systems. Since about the early 1980's, it has become common to use vacuum toilet systems in large commercial aircraft. These vacuum waste systems typically include a toilet bowl for collecting waste, a waste holding tank, a vacuum pump, and a valve system for placing the toilet bowl in communication with the waste holding tank. A rinse valve controls the introduction of rinse water into the toilet. The system is typically controlled by an electronic controller.

The problem of disposal of food waste has not yet been fully addressed. During in flight operation of commercial aircraft, a large quantity of food and beverage leftovers can accumulate on an airplane, the volume depending on the number of the passengers and the duration of the flight. This leftover waste can come in the form of solids, liquids, and/or a mixture of the two, called "slurry." Thus, the handling of this waste is an issue, particularly on longer flights having many passengers. During such flights, holding the waste in the aircraft galley (food preparation area) on the trays and in the carts in which the food and beverages are served for the duration of the flights is: 1) impractical because of the relatively large quantity of food stored and served; 2) unsanitary; and 3) can be unsightly.

Currently, most commercial aircraft are equipped with galley sinks. However, these sinks are intended for the disposal of fluid waste only as they are connected to small diameter drain lines, ranging from about one half to one inch in diameter, and terminating at the aircraft drain mast for exhaustion to the atmosphere. Unfortunately, such sink systems are unable to dispose of slurry and solid food waste products.

In response to this problem, flight attendants have often been instructed to dispose of solid and slurry food wastes into the toilets which are located near the galleys. Conventional aircraft vacuum toilets are effective for disposing of such food waste products for a number of reasons. First, they are connected through much larger lines, typically two inches in diameter, to waste holding tanks. Further, conventional aircraft vacuum toilet systems transfer waste from the toilet bowl to the waste holding tanks via a differential pressure action, thereby ensuring immediate and complete evacuation. In particular, the air pressure in the toilet bowl is at cabin pressure (which is pressurized for the safety and comfort of those on board), while the drain line is maintained at a much lower air pressure from a source of vacuum. This source is typically either a vacuum pump or the atmospheric pressure outside of the airplane, which is very low at cruising altitudes of thousands of feet above sea level. This differential reaches approximately 8.5 p.s.i. at an altitude of about 35,000 feet. Thus, when the flush valve separating the two atmospheres is opened, a strong vacuum action results and powerfully draws the contents of the toilet bowl into the waste holding tanks.

While disposing food waste in aircraft toilets is effective for its removal from the cabin, several problems and disadvantages have been identified. First, it can be quite unsanitary for a flight attendant to enter into a lavatory to dump food waste into a toilet bowl while working with food in the galley. For example, given the time demands on flight attendants, there is a possibility, and perhaps even a likelihood, that they will fail to wash their hands each time they exit the lavatory. Second, requiring attendants to dispose of food wastes in toilets is both inconvenient and inefficient. The process requires the attendant to carry the container holding the waste from the galley to the lavatory, open the door, bend down to the level of the toilet bowl and pour the waste into the bowl, taking care that it does not spill anywhere but in the bowl. This may have to be repeated several times until all or enough of the food waste is flushed down the toilet.

Further, using a toilet bowl requires, of course, that one be available. However, availability of the lavatories is subject to their occupancy by the passengers. It would be inefficient for an attendant attempting to complete the task of cleaning up after a meal to have to wait until a toilet became available. Additionally, requiring flight attendants to use toilets for the disposal of food waste appears unprofessional and can be distasteful to the flying public.

One approach to the general problem of food waste disposal during in flight operation of commercial aircraft, which has come to the inventor's attention, has been a proposed design for a galley sink system based closely upon existing aircraft vacuum toilet designs. Thus, such a sink system would include a drain line having a much larger diameter than conventional galley sinks and would operate on the same differential pressure, or vacuum, theory used by conventional vacuum toilet designs.

While generally effective for disposing of solid, liquid and slurry food wastes, implementing one of the conventional vacuum toilet designs into a galley sink system is unsatisfactory for numerous reasons. First, these designs do not account for the potential for clogged drain lines. In particular, if and when the drain line of a conventional vacuum toilet becomes clogged, flush cycles may continue to operate and rinse water may continue to be introduced into the bowl despite the lack of pressure differential between each side of the flush valve (i.e. between the bowl and the drain line). Thus, the system is enabled until the stoppage is identified by an individual and the problem is corrected. Under this condition, the toilet bowl itself could even eventually begin to fill with a mixture of rinse water and black, or human waste, water. However, due to sanitation concerns and health and safety regulations, this situation would be unacceptable in a galley sink environment, where the sink bowl may not become contaminated with either used sink water, called grey water, rising from the clogged sink drain line, or black water rising from the aircraft's main drain line.

A second problem concerns the potential for large objects being dropped or flushed into the drain line. Certain objects often found in a galley, including chopsticks, cutlery, and large bones, while too large to be disposed of by a galley sink system, could inadvertently enter into the sink bowl, and, because of their elongate and relatively narrow shapes, pass the sink bowl's waste disposal outlet, enter into the drain line and become lodged therein. Other objects, such as solid food waste that would normally pass through the system could then become engaged with the lodged object, eventually leading to a clogged condition. Even worse, the large object could find its way into the flush valve assembly and cause the flush valve to malfunction or break. Thus, such an obstructed object must be promptly removed from the drain line. However, with conventional drain line designs, its removal would be quite burdensome, requiring disassembly of the galley sink drain line. Further, the lodged object may not be identified until only after one of the aforementioned, or other, resultant problems arise. Thus, a need exists for a galley sink system that prevents such an object from becoming lodged in the drain line while permitting other food wastes to enter into the line for disposal.

Another problem with the earlier galley sink design relates to noise. A loud flushing sound is created when the flush valve opens and the differential pressure across it forcefully draws the waste down the drain. The lid, or shroud, of the earlier galley sink design, based closely on conventional toilet shrouds, somewhat helps reduce the noise output, but not to a sufficient degree. This noise level has generally not been objectionable for aircraft toilets because they are located within lavatories whose doors are typically closed when flushing occurs. Therefore, the noise is relatively isolated from the passengers during flushing. Also, the toilet bowl height, typically at sixteen inches, is almost three feet away from the typical passenger's ears, thus reducing the impact of high sound level. However, this same level of noise would be unacceptable in the galley of the aircraft. The galley is typically in an open area and close to at least some passengers who could hear the flushing noise even with a conventional toilet-type lid covering the sink. Further, the sink in a galley is mounted much higher off of the floor, typically 44 inches high, and is closer to the ears of the operators than is the case with toilets. Thus, a definite need exists for a galley waste disposal that is quiet enough in operation not to disturb passengers and attendants.

A further problem of the earlier galley sink design and conventional toilet designs relates to the potential for overflow of waste onto the floor or into the cabinet which may house the sink. Since the top of the sink must be covered for the sake of noise reduction, in order to allow cabin pressure air to enter the bowl to create the differential pressure needed for vacuum flushing, an overlapping shroud design has been suggested. In this sink design, which is similar to conventional toilet designs, a shroud covers over the sink but maintains an opening around the perimeter, or mouth, of the bowl to allow air to enter. One problem that can arise is that when the sink bowl starts to fill up with waste to be disposed, excess fluid could overflow under the shroud and into the cabinet without the attendant recognizing the overfill condition. Such fluid waste entrapped in the cabinet could cause erosion and odor problems and would likely require frequent maintenance. Thus, a need exists for a galley sink system that eliminates the potential for overflow spillage, particularly in the cabinet which houses it, if there is one.

U.S. Pat. No. 5,165,457, issued to Olin et al., describes a vacuum toilet sewer arrangement for a toilet bowl including an air tight lid made of relatively sound-proof material to the reduce the noise associated with vacuum flushing action. Enablement of a function impulse, such as a user-operated push button, can be made dependant on the closing of the lid. Further, an air tube is connected to the toilet bowl in order to provide the ambient air necessary for efficient vacuum flushing. While incorporating these toilet system features into a galley sink disposal system would address some of the aforementioned problems, the potential concern that is unique to a vacuum galley sink system, namely the clogged drain situation, is not addressed by this patent.

In sum, there exists a definite need for a galley waste disposal system that prevents a backup into the sink bowl upon a clogged drain condition, that is quiet in operation, that cannot overflow into the cabinet in which it is housed, and that does not permit elongate objects that could get stuck in the drain line from entering the line.

SUMMARY OF THE INVENTION

The present invention constitutes a system and method for food waste disposal designed to solve the problems that have been discussed. In accordance with the broadest embodiment of the present invention, an operator controlled aircraft galley waste disposal system is connected to a vacuum waste system on the aircraft having a waste holding tank and a source of vacuum in communication with the waste holding tank. This vacuum source is either the ambient pressure of the air outside of the aircraft or an artificial source, such as a vacuum pump.

The aircraft waste disposal system includes a sink bowl, defining a waste receiving interior and a mouth and having a waste disposal outlet, and a waste drain line in communication with the waste disposal outlet, the waste holding tank, and the source of vacuum. Further, a flush valve assembly is disposed between the waste disposal outlet and the waste drain line and has a flush valve that is movable between normally closed and opened positions to prevent and permit flow therethrough, respectively, such that the waste drain line enables waste collecting in the sink bowl to flow to the waste holding tank when the flush valve is open. The system also includes a controller operatively connected to the flush valve assembly, to selectively signal the flush valve assembly to open the flush valve to flush the waste in the sink bowl, and a sensor connected to the controller and extending into the waste drain line to detect a condition in the drain line in which it has become clogged, or plugged, with waste. When the sensor detects such a clogged condition, the controller disables the operation of the flush valve assembly to prevent the flush valve from moving from its normally closed position. Thus, any standing waste that may build up in the drain, whether it be grey water coming from the unit's sink bowl, or grey and black water from other upstream galley sinks and toilets connected to the unit via the aircraft's main waste drain line, will not further build up due to subsequent flushes and will not have the opportunity to rise to the level of the sink bowl and come in contact with any fluid within it.

The clogged condition can be sensed in a variety of ways. In the preferred embodiment, the sensor is a vacuum pressure sensor that extends into the waste drain line to detect a pressure level in the waste drain line indicative of a clogged condition. The pressure level indicates the presence or absence of a clogged condition in the following way. As is well understood, an unobstructed drain line in a vacuum-operated system is maintained in a vacuum condition, i.e. at a very low pressure relative to the aircraft ambient pressure. However, in the event that waste plugs the sink's drain line or the main drain line at a point downstream of the sensor, the drain line upstream of the plug will no longer be at this low pressure level the next time the flush valve momentarily opens. Instead, it will adjust to the aircraft ambient, thereby eliminating pressure differential needed for proper vacuum action. Accordingly, when the sensor detects such a pressure in the drain line indicative of a clogged situation, it signals the controller to disable the flush valve assembly, preventing the valve from opening. In one preferred embodiment, the sensor signals the controller to disable the flush valve assembly when it detects a drain line pressure above a preset threshold, for example, 1 p.s.i of differential pressure.

In another embodiment, the sensor is a liquid or slurry level sensor residing inside the drain line. When a clogged condition develops, subsequent flushing operations will cause the waste plug to rise in the line. When the plug rises to and above the level of the sensor, the sensor detects the fluid or waste and signals the controller to disable the flush valve assembly.

In a more detailed embodiment, the galley sink system includes a rinse subsystem having a rinse valve and a rinse line connected to the rinse valve and terminating in the sink mouth, through which rinse water is selectively introduced into the waste receiving interior for rinsing the bowl just prior to the opening of the flush valve. The rinse subsystem is controlled by the controller and is also disabled when the sensor detects a clogged condition.

In an even more detailed embodiment of the present invention, a cover that completely seals the sink bowl opening is included. This cover reduces the audible noise associated with flushing to an acceptable level. The particular structure that accomplishes this is a hinged cover that swings and springs closed after the waste to be disposed of is placed in the sink. In an embodiment in which the sink is mounted in a cabinet, such as a half cart, the sealed cover also prevents waste from unknowingly overflowing into the cabinet. The cover may also include a seal attached to its underside to provide an even more complete seal when the cover is closed over the sink bowl.

Since the sink is completely sealed at the top by the cover, the waste receiving interior of the sink includes an air inlet port which is in fluid communication with an air inlet duct that extends above the entire assembly. This provides the ambient cabin air pressure in the sink bowl needed for the differential pressure action. Thus, with the introduction of a sealed and sound-deadening cover and a direct air duct into the sink, the problems of noise, overfilling and spillage into the cabinet, and the resulting maintenance and odor issues are completely prevented.

In still another embodiment, in order to prevent elongate objects that are too large for the system to dispose from becoming lodged in the drain line, the galley sink system includes an elbow-shaped pipe directly connected at one end to the sink bowl's waste outlet. Both the pipe diameter and bend radius range from one inch to two inches in size. In the preferred embodiment, the pipe has a diameter of 1.5" and a bend radius of 1.5", each with standard tolerances. A pipe of this diameter and radius only traps in its bend, preventing the passage of, rigid elongate objects that are large enough to become stuck in the drain. Smaller objects that can pass this elbow-shaped pipe can equally safely pass through the rest of the drain line. Further, the bend in the pipe is located very close to the sink drain outlet so that any elongate objects that do become stuck in the pipe bend protrude into the sink bowl interior and can be easily removed by hand.

In order to ensure that the system will not operate with the cover open, a further embodiment includes a cover having at least one magnet embedded therein and a sink bowl having a sensor, such as a proximity sensor, embedded therein to sense the magnet when the cover is closed and to signal the controller to enable the flush valve assembly only when it senses that the cover is closed.

In another embodiment, an anti-siphon valve is positioned above the sink to prevent reverse flow of contaminated water into the potable water supply to insure that the aircraft water system remains safe for human consumption. In still another embodiment, the counter top of a half cart cabinet and the sink comprise a unitary, stainless steel structure.

Another feature of the present invention is the provision of a cover readily changeable in its mounting orientation. Since galley configurations vary from aircraft to aircraft or even within one aircraft, a cover is provided which can be installed in a variety of galley positions. In one particular embodiment, the cover may be mounted and hinged at the rear, left, or right sides of the galley sink top, depending on the location of the system. In the preferred embodiment, the cover is constructed from stainless steel metal encapsulating sound deadening material. The cover has a substantially square or rectangular shape and at one end is provided with a shaft at each end. Each shaft is designed as an integrated rolling cam having positioning "notches." As the cover is opened or closed the cams rotate and engage, or lodge into, a corresponding indentation within the square sink top opening via a spring force. In this way the cover can be spring-forced into desired positions, such as the open and closed positions. The cover may also be disengaged from the sink top so the unit could be easily cleaned.

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of an aircraft galley waste disposal system and method, namely, one that provides a sink, a drain line, a flush valve assembly having a normally closed flush valve, a rinse subsystem having a rinse valve and rinse outlet, a controller and a sensor extending into the drain line. It also includes a cover which completely seals the mouth of the sink when flushing the waste, and an air inlet subsystem which draws air into the sink bowl from a duct that terminates above the sink. The invention, however, may also be applied to other types of systems and equipment as well.

Figure 1:
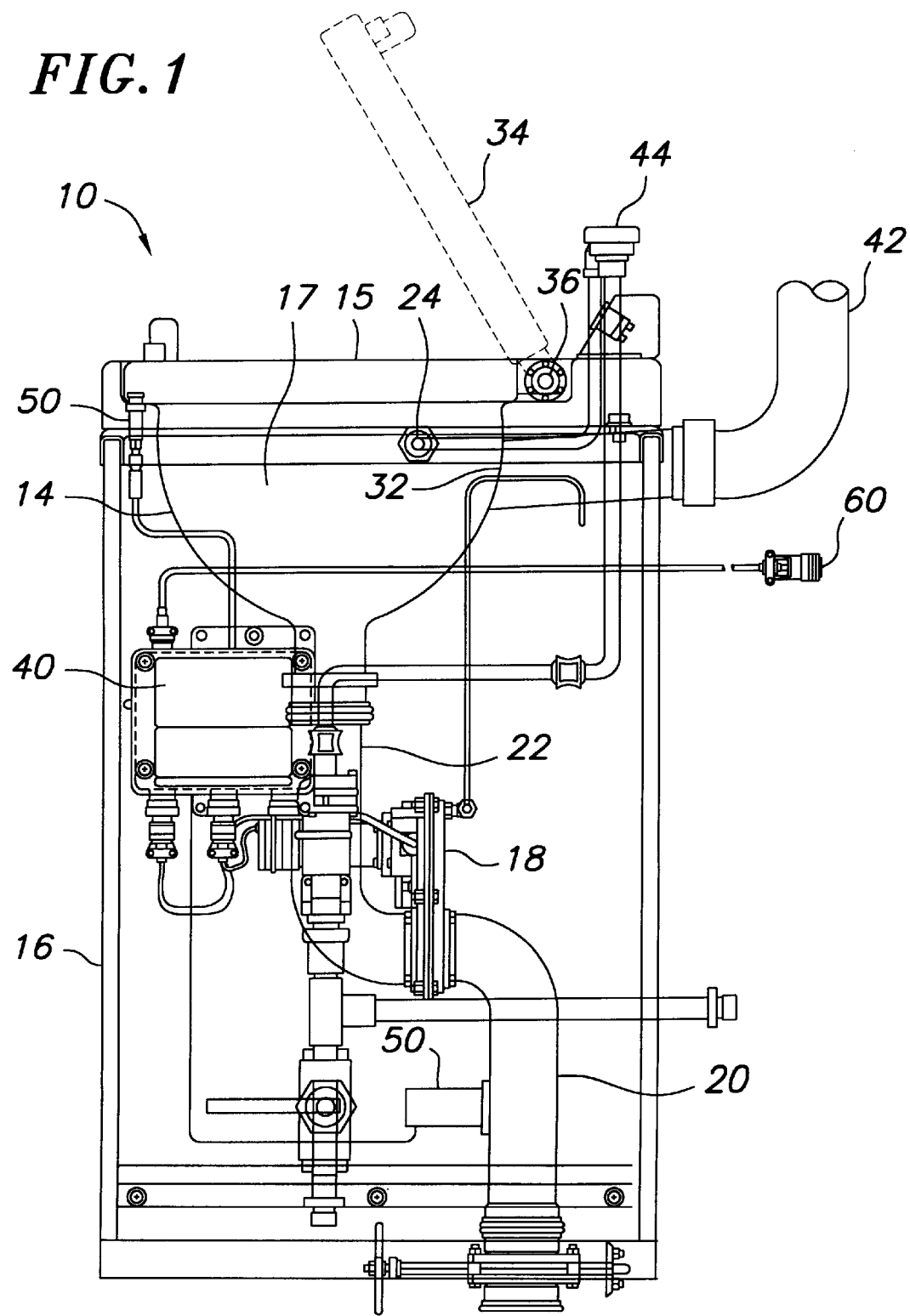
FIG. 1 is an elevational view of one side of the preferred embodiment of the galley waste disposal system of the present invention with the cover in a closed position.
Figure 2:
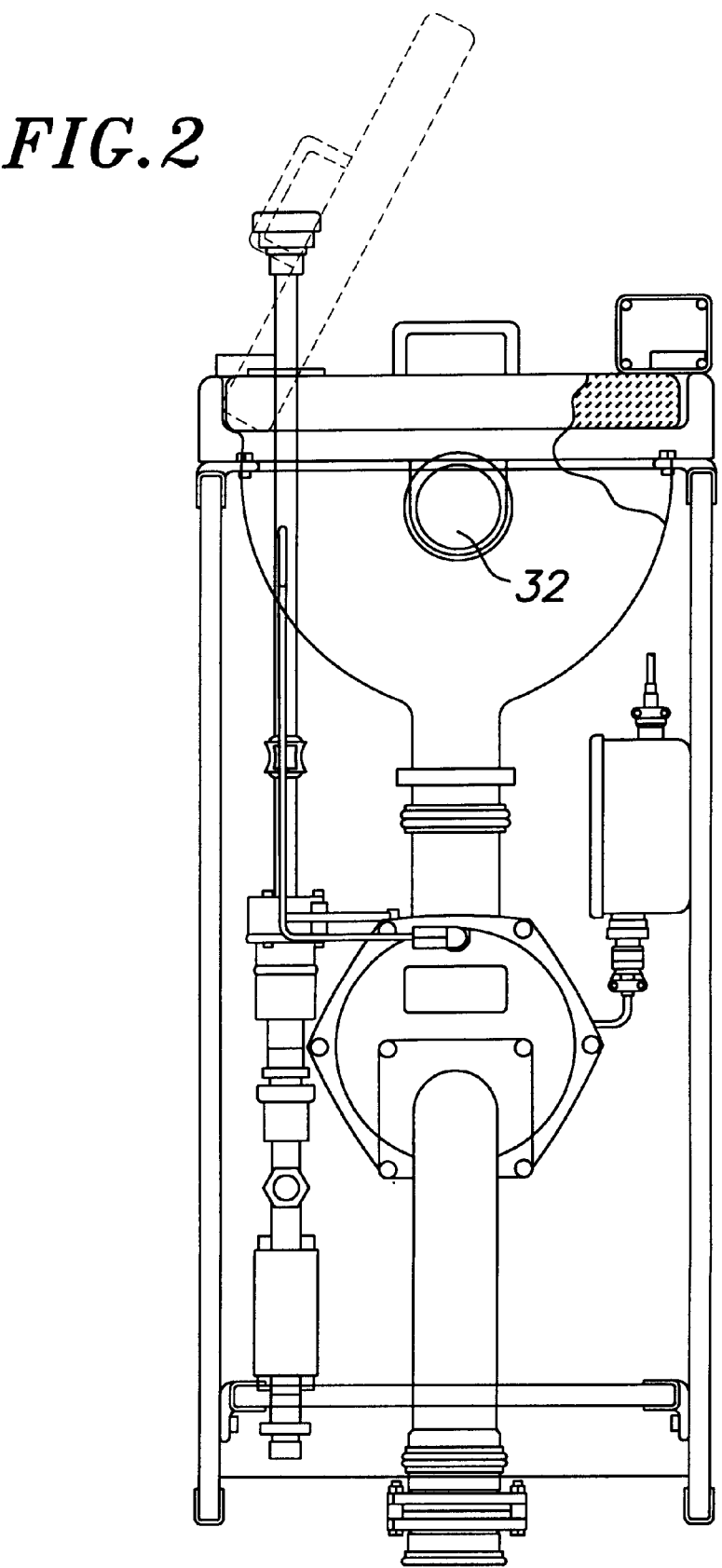
FIG. 2 is an elevational view of a second side of the system shown in FIG. 1; and, FIG. 3 is a top view of the system shown in FIG. 1 with the cover closed.

Referring to FIGS. 1 and 2, a particular embodiment of a galley waste disposal system 10 is shown. A sink bowl 14 is installed in a galley of an aircraft. The mouth 15 of the sink bowl 14 is positioned in the galley at approximately waist height to a typical standing cabin flight attendant. The sink bowl 14 has a waste receiving interior 17 for collecting therein the waste to be disposed of and a disposal outlet 30 near its bottom of approximately 1.5 inches in diameter. This is substantially larger than the diameter of conventional galley sinks in order to accommodate the passage of solid and slurry food waste. In operation, waste passes the disposal outlet 30, through an elbow-shaped pipe 31, through a flush valve assembly 18 having a normally closed valve that is momentarily open, and down the waste drain line 20, having an approximately two inch diameter, for evacuation into a waste holding tank (not shown).

The disposal system 10 is also equipped with a rinse subsystem comprising a rinse valve 22 connected through a rinse line to a rinse outlet 24 in the bowl 14 for introducing a rinsing liquid into the bowl at the start of a flush cycle and just prior to the opening of the valve of the flush valve assembly 18. Also shown is an anti-siphon valve 44 that exists above the cabinet and is permanently secured in this position.

The flush valve assembly 18 and rinse subsystem are controlled by an electronic controller 40 which interfaces with the aircraft power and vacuum waste control systems, and provides power to the flush valve assembly 18 and rinse valve 22. It will be appreciated that designing the controller 40 into such a vacuum waste disposal system is performed in a manner that is well understood. Under normal operating conditions, when a flush switch 60, mounted on top of the unit, is depressed by the operator, a flush cycle is initiated in the flush controller 40. In particular, a small amount of rinse water is injected into the sink 14 via rinse outlet 24, and, subsequently, the flush valve opens allowing the vacuum in the waste system to rapidly draw the mixture of water and waste down the drain line 20 and into the waste holding tank.

However, if a waste clog develops in the line, rendering the vacuum action in the drain line ineffective, flush cycles must cease in order to prevent a buildup of standing waste water into the sink. Accordingly, the present invention includes a sensor 65 extending into the drain line 20 which is capable of identifying such a condition and signaling the controller 40 to disable the flush valve assembly and rinse subsystem.

In the preferred embodiment, the sensor 65 is an air pressure sensor that extends into the drain line 20 to sense the pressure inside the line. The sensor is connected to the controller 40 and continuously provides information to the controller relating to the pressure inside the drain line. One example of an acceptable pressure sensor is a stainless steel, "Process Transmitter—Model CIP-Ultra," manufactured by SENSOTEC (Columbus, Ohio). It is understood, however, that other air pressure sensors known in the art are equally acceptable alternatives. Under normal conditions, the sensor reads a relatively very low pressure in the line indicative of a proper vacuum condition. However, in the event of the development of a clog anywhere downstream of the sensor 65, whether it be in the galley sink disposal system's drain line 20 or the aircraft's main waste drain line, as soon as the valve assembly 18 opens its flush valve for a subsequent flush cycle, or as soon as the flush valve of any other vacuum sink or vacuum toilet upstream of the unit opens, that portion of the system's drain line 20 that is above the clog will transition to the relatively high aircraft cabin pressure. When the pressure sensor 65 detects this condition, which, in one preferred embodiment, is a pressure of 1 p.s.i. or above, it provides this clogged-condition information to the controller 40, which, in turn, disables the (1) flush valve assembly 18, thus maintaining its flush valve in its normally-closed and sealed position, and (2) rinse subsystem to keep the rinse valve 22 closed, until the sensor detects a normal vacuum condition in the line (i.e. after the clog is cleared and the pressure drops below 1 p.s.i.).

Pressure sensing is not the only suitable means of sensing a clogged drain situation. For example, a liquid level sensor located inside the drain line can be implemented in order to identify the presence of standing (or rising) water in the line, thus indicating a potential clogged situation. It is understood that other clog detection methods known to those skilled in the art are acceptable alternatives. In sum, the waste disposal system 10 of the present invention is inoperable unless a sensor provides data indicative of a clear drain line.

Connected to and adjacent to the sink's disposal outlet 30 is a specially-designed elbow-shaped pipe 31. Both the pipe diameter and bend radius range in size anywhere from 1.0" to 2.0". In the preferred embodiment, the pipe diameter and bend radius are each 1.5" with standard tolerances. This pipe traps in its bend, and prevents the passage of, only rigid elongate objects that are large enough to become stuck in the drain. Smaller objects that are able to pass this elbow-shaped pipe 31 can equally safely pass through the rest of the drain line. Further, the bend in the pipe 31 is located very close to the sink drain outlet 30 so that any elongate objects that do become stuck in the pipe bend will also protrude into the waste receiving interior 17 of the sink bowl 14 and can be easily removed by hand. This design tends to eliminate the potential for rigid elongate objects, such as broken chopsticks, that are too large to pass through the drain line, from becoming lodged therein, which could result in a system malfunction, and costly and time intensive maintenance and repair.

Figure 3:
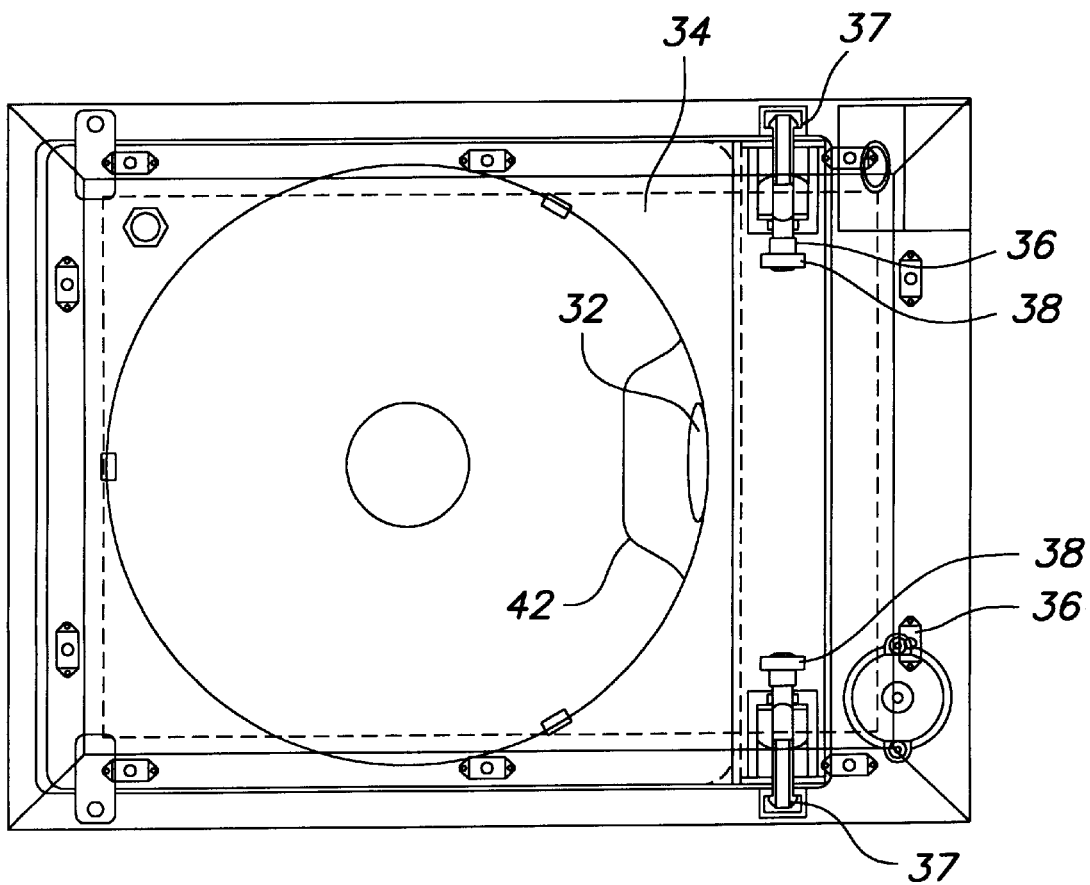

The sink 14 is shown with a cover 34 in its closed position and hinged to the sink with pins 36. In the preferred embodiment, the cover is constructed from stainless steel encapsulating a sound-deadening material. Referring to FIG. 3, the two pins 36 have integrated shafts 37 that are formed as rolling cams having positioning "notches." As the cover is opened or closed the cams rotate and the notches engage, or lodge into, a corresponding indentation within the sink top opening via a spring force (not shown). In this way, the cover can be spring-forced into desired positions, such as the open or closed position. The pins 36 can be pulled outwardly by grasping their heads 38 for disengaging the cover 34 from the sink top, so the unit could be easily cleaned. In the particular embodiment shown in FIGS. 1, 2 and 3, the cover 34 is hinged at the back side of the galley sink top, when facing the system. It is understood, however, that based on the space available and the location of the sink in the particular aircraft galley, the cover 34 may alternatively be hinged in another acceptable orientation, so that the cover swings open to the left or to the right of the unit, for example. In another embodiment, the galley system is designed with one cover that may be hinged in any of the desirable orientations discussed above. In other words, the cover is selectively hingeable to the sink top so that it may swing open to the left, right, or back of the sink bowl when facing the system.

When the cover 34 is closed over the mouth 15 prior to a flush cycle, an essentially air tight seal is created thereby preventing liquid or slurry waste from overflowing and oozing out the top of the sink. To help create an air tight closure, a seal, such as a rubber grommet (not shown), attached to the perimeter of the underside of the cover 34, can be included.

As further shown in FIG. 3, since during a flush cycle the sink is sealed from above by the cover 34, a subsystem is included in order to provide cabin pressure to the otherwise sealed bowl 14. This is required, as discussed above, to establish the differential pressure necessary between the bowl and the drain line for accomplishing vacuum flushing action. In particular, the air inlet subsystem includes an air inlet port 32 in the sink bowl 14 connected to an air inlet duct (not shown) that exists out of and terminates above the cabinet containing the system 10. Also shown is a baffle 70 located within the sink bowl 14 and covering the air inlet port 32. The baffle 70 is provided to visually mask the inlet 32 into the bowl 14. It is also used to direct the airflow towards the bottom of the bowl 14 to prevent fluid from splashing all over the its interior and the cover 34 interior.

The waste disposal system 10 is inoperable both unless the cover 34 is in the closed position and the sensor 65 provides data indicative of a proper vacuum condition in the drain line. Thus, in the preferred embodiment, a Hall effect proximity sensor 50 built into the sink top enables the flush switch 60 only when it detects a magnet embedded in the side of the cover 34 indicating a "cover-closed" position. The proximity sensor 50 is mounted on the unit below the sink at the center line of the cover. By embedding magnets in two or more sides of the cover on the centerline of each side, the cover position can be easily changed to suit the particular installation orientation without any loss of functionality. It is understood that alternative position sensing systems may be implemented in place of a Hall effect proximity sensor system.

Having thus described an exemplary embodiment of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

I claim:

1. An operator controlled aircraft galley waste disposal system, connected to a vacuum waste system on the aircraft having a waste holding tank and a source of vacuum in communication with the waste holding tank, the galley waste disposal system comprising:

a sink bowl defining a waste receiving interior and a mouth, said sink bowl having a waste disposal outlet;

a waste drain line in communication with said waste disposal outlet, the waste holding tank, and the source of vacuum;

a motorized flush valve assembly disposed between said waste disposal outlet and said waste drain line, said assembly having a flush valve movable between a normally closed and an open position preventing and permitting flow therethrough, respectively, said waste drain line enabling waste in said sink bowl to flow to the waste holding tank when said flush valve is open;

a controller operatively connected to said flush valve assembly, which selectively signals said flush valve assembly to move said flush valve from the normally closed position to the open position;

a sensor connected to said controller and extending into said waste drain line to detect a condition in said drain line in which it has become clogged with waste, said controller, upon detection of a clogged condition by said sensor, disabling the operation of said flush valve assembly to prevent said flush valve from moving from its normally closed position; and a cover having an underside, wherein said cover is selectively and movably mounted over said sink bowl for closing over and substantially sealing said mouth of said sink bowl, to reduce the sound perceived when waste flows from said waste receiving interior to the waste holding tank and preventing waste from leaking out of said bowl when said cover is in a closed position;

wherein said cover further includes a magnet embedded therein and said bowl further includes a proximity sensor embedded therein and connected to the controller to sense said magnet when said cover is closed, and to signal said controller to enable said flush valve assembly only when said cover is in the closed position.

2. An operator controlled aircraft galley waste disposal system, connected to a vacuum waste system on the aircraft having a waste holding tank and a source of vacuum in communication with the waste holding tank, the aircraft galley waste disposal system comprising:

a sink bowl defining a waste receiving interior and a mouth, said sink bowl having a waste disposal outlet;

a waste drain line in communication with said waste disposal outlet, the waste holding tank, and the source of vacuum;

a motorized flush valve assembly disposed between said waste disposal outlet and said waste drain line, said assembly having a flush valve movable between a normally closed and an open position preventing and permitting flow therethrough, respectively, said waste drain line enabling waste in said sink bowl to flow to the waste holding tank when said flush valve is open;

a controller operatively connected to said flush valve assembly, which selectively signals said flush valve assembly to move said flush valve from the normally closed position to the open position;

a vacuum pressure sensor connected to said controller and extending into said waste drain line to detect a pressure level in said waste drain line indicative of a condition in said drain line in which it has become clogged with waste, said controller, upon detection of a clogged condition by said sensor, disabling the operation of said flush valve assembly to prevent said flush valve from moving from its normally closed position; and a cover having an underside, wherein said cover is selectively and movably mounted over said sink bowl for closing over and substantially sealing said mouth of said sink bowl, to reduce the sound perceived when waste flows from said waste receiving interior to the waste holding tank and preventing waste from leaking out of said bowl when said cover is in a closed position;

wherein said cover further includes a magnet embedded therein and said bowl further includes a proximity sensor embedded therein and connected to the controller to sense said magnet when said cover is closed, and to signal said controller to enable said flush valve assembly only when said cover is in the closed position.

* * * * *